(12) United States Patent
Grunert et al.

(10) Patent No.: US 8,650,771 B2
(45) Date of Patent: Feb. 18, 2014

(54) METHOD FOR THE OPERATION OF A HOUSEHOLD APPLIANCE USED FOR TAKING CARE OF LAUNDRY

(75) Inventors: Klaus Grunert, Berlin (DE); Günter Steffens, Dallgow-Döberitz (DE); Andreas Stolze, Falkensee (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 670 days.

(21) Appl. No.: 12/447,767

(22) PCT Filed: Oct. 24, 2007

(86) PCT No.: PCT/EP2007/061377
§ 371 (c)(1),
(2), (4) Date: Apr. 29, 2009

(87) PCT Pub. No.: WO2008/052914
PCT Pub. Date: May 8, 2008

(65) Prior Publication Data
US 2010/0071226 A1    Mar. 25, 2010

(30) Foreign Application Priority Data
Oct. 31, 2006  (DE) .................... 10 2006 051 504

(51) Int. Cl.
*F26B 3/34*  (2006.01)
(52) U.S. Cl.
USPC ................ 34/493; 34/495; 34/496

(58) Field of Classification Search
USPC .......... 34/443, 467, 471, 472, 473, 475, 476, 34/486, 495, 496; 62/3.3
See application file for complete search history.

(56) References Cited

U.S. PATENT DOCUMENTS

| | | | | |
|---|---|---|---|---|
| 3,036,383 A | * | 5/1962 | Edwards | 34/76 |
| 3,471,937 A | * | 10/1969 | Genbauffe | 34/527 |
| 4,112,589 A | * | 9/1978 | Palfrey et al. | 34/553 |
| 2005/0050758 A1 | * | 3/2005 | Park et al. | 34/425 |
| 2005/0132599 A1 | * | 6/2005 | Lee et al. | 34/549 |
| 2006/0168840 A1 | | 8/2006 | Paintner | |

FOREIGN PATENT DOCUMENTS

| | | |
|---|---|---|
| DE | 1410206 | 10/1968 |
| DE | 6926182 | 12/1969 |
| DE | 1922705 | 11/1970 |
| DE | 1817058 | 5/1971 |
| DE | 20202782 U1 | 5/2002 |
| DE | 20101641 U1 | 7/2002 |
| DE | 10210842 A1 | 9/2003 |
| DE | 69813489 T2 | 4/2004 |
| DE | 69828856 T2 | 1/2006 |
| DE | 102004055926 A1 | 5/2006 |

\* cited by examiner

*Primary Examiner* — Jiping Lu
(74) *Attorney, Agent, or Firm* — Nixon & Vanderhye P.C.

(57) ABSTRACT

A method for operating a household appliance used for taking care of laundry. In the method, a Peltier heat pump of the household appliance is activated and is supplied with electric power for drying the laundry. The power supplied to the Peltier heat pump is varied during the drying process in accordance with a reached process phase of the drying process.

6 Claims, No Drawings

METHOD FOR THE OPERATION OF A HOUSEHOLD APPLIANCE USED FOR TAKING CARE OF LAUNDRY

The invention relates to a method for operating a household appliance used for taking care of laundry, in which a Peltier heat pump of the household appliance is activated and is supplied with electric power for drying the laundry. In a further aspect of the invention a process air stream flowing to the Peltier heat pump is generated during a drying process with such a method.

BACKGROUND OF THE INVENTION

A tumble dryer which feature a Peltier heat pump is known for example from DE 69 261 82 U1.

Depending on the space available to house it in a tumble dryer, the air mass flow able to be realized and the electrical connected load of the Peltier heat pump, the drying times able to be realized in such a tumble dryer are usually quite long. It is possible to shorten the drying time by improving the pump factor of the heat pump and shortening the heat-up phase of the tumble dryer. This improvement criterion relates to a high process temperature with low connected load. Although a higher electrical connected load of the Peltier heat pump leads to a slightly shortened drying time, the energy target can no longer be achieved because of the lower efficiency during operation of this Peltier heat pump.

A tumble dryer with Peltier heat pump is known which as a result of a relatively low connected load of the Peltier elements of this heat pump of around 600 W to around 1200 W and a pump power of around 350 W to 700 W, has a relatively long heat-up phase and drying phase.

SUMMARY OF THE INVENTION

The object of the present invention is thus to create a method with which a household appliance for taking care of laundry can be operated so that the drying time can be shortened.

In accordance with the invention a Peltier heat pump of a household appliance used for taking care of laundry is activated and supplied with power for drying the laundry. The supply of power to the Peltier heat pump during the drying process is varied as a function of the process phase reached. By this change in the setting of the power supplied, the supply of power to the Peltier heat pump and thus also to the household appliance can be controlled in an optimum manner such that the drying process is shortened. This optimization also allows the power consumption of the household appliance to be reduced.

The supply of power, especially the electrical power of the Peltier heat pump, is preferably set to a higher power level during a heat-up phase of the drying process of the household appliance than during a drying phase of the drying process following the heat-up phase. The drying process essentially comprises the heat-up phase, the drying phase and the end phase in a chronological sequence. By shortening the heat-up phase in particular, which can be guaranteed by increasing the electrical connected load, the drying time of the laundry can also be reduced. In addition such a shortening of the heat-up phase enables the Peltier heat pump to be operated longer at its optimum for the remainder of the drying process.

In this context it is important to note that the layout (including definition of a rated value of the power consumption) of a Peltier heat pump is primarily designed for those operating states which the heat pump assumes the most. Accordingly this operating state is an operating state corresponding to the drying phase, not the heat-up phase. Accordingly the invention comprises operation of the Peltier heat pump with a power consumption above the rated design value of the heat-up phase.

Preferably an increased electrical power is set for a predeterminable period and/or an increased electrical power is set in the household appliance until a predeterminable temperature threshold value is reached.

Preferably, at the beginning of the drying phase, the Peltier heat pump is activated for a limited time or up to a given temperature with a higher voltage or with a higher current limit. The higher electrical connected load of the Peltier heat pump then heats the household appliance and the laundry up rapidly and the high process air temperature brings the Peltier heat pump to its operational optimum when it is subsequently powered down. In this case, especially preferably for a predeterminable period, an increased power and/or an increased power until a predeterminable temperature threshold value is reached are set in the household appliance.

Preferably the electrical power of the Peltier heat pump is set to lower during an end phase following the drying phase of the drying process of the household appliance than during the previous drying phase. The energy management of the household appliance can also be further improved in this manner.

Preferably a lower power is set in the end phase for a predeterminable period and/or a lower electrical power is set until a predeterminable temperature threshold value is reached in the household appliance. Instead or in addition a lower electrical power can also be set until a predeterminable moisture threshold value of the process air is reached. A plurality of criteria are thus able to be predetermined, on the basis of which a decision is made as to whether this electrical power can be reduced or as to when this electrical power can be reduced. Thus the electrical connected load of the Peltier heat pump is preferably reduced by reducing the electrical voltage or the electrical current under time control and/or under temperature control and/or moisture control at the end of the drying process as a result of a lower moisture content of the process air for example.

DETAILED DESCRIPTION OF THE EXEMPLARY EMBODIMENTS OF THE PRESENT INVENTION

An exemplary embodiment of the invention is explained in greater detail below.

In the tumble dryer embodied with a Peltier heat pump the electrical connected load is varied during the drying process and especially during the heat-up phase. Such variation is carried out especially by changing an electrical voltage arising via the Peltier heat pump and/or by setting an electrical current flowing through the Peltier heat pump. During the heat-up phase there is provision for this electrical connected load of the Peltier heat pump to be set higher than during the drying phase. In particular in such cases the electrical voltage or the electrical current can be varied accordingly and can be increased during the heat-up phase by comparison with the drying phase. Furthermore, during the end phase, in which the laundry is dry, the electrical connecting power and thus especially the electrical voltage or the electrical current is reduced by comparison with the value set during the drying phase.

The invention claimed is:

1. A method for operating a household appliance for taking care of laundry, comprising
   activating a Peltier heat pump of the household appliance and supplying the Peltier heat pump with electrical power for drying the laundry, wherein the supplying step comprises varying the power supply of the Peltier heat pump during a drying process as a function of a reached process phase of the drying process, and wherein the varying step comprises setting an increased power level supplied to the Peltier heat pump until a predetermined temperature-threshold value is reached in the household appliance, wherein the drying process includes a heat-up phase, a drying phase following the heat-up phase, and an end phase following the drying phase, wherein a rated design value of the Peltier heat pump corresponds to the electrical power level during the drying phase, the step of setting an increased power level comprising increasing the level of the electrical power supplied to the Peltier heat pump during the heat-up phase of the drying process to a level greater than the rated design value of the Peltier heat pump.

2. A method of operating a household appliance for caring for laundry, the method comprising:
   activating a Peltier heat pump of the household appliance;
   supplying the Peltier heat pump with electrical power during a drying process for drying the laundry; and
   varying the electrical power supplied to the Peltier heat pump during the drying process based on a reached process phase of the drying process, wherein the varying step comprises one of:
      increasing a level of the electrical power supplied to the Peltier heat pump for a predetermined period of time; and
      increasing a level of the electrical power supplied to the Peltier heat pump until the household appliance reaches a predetermined temperature-threshold value
   wherein the drying process includes a heat-up phase, a drying phase following the heat-up phase, and an end phase following the drying phase, wherein a rated design value of the Peltier heat pump corresponds to the electrical power level during the drying phase, the steps of increasing the level of the electrical power comprising increasing the level of the electrical power supplied to the Peltier heat pump during the heat-up phase of the drying process to a level greater than the rated design value of the Peltier heat pump.

3. The method as claimed in claim 2, wherein a level of the electrical power supplied to the Peltier heat pump during the end phase of the drying process is less than a level of the electrical power supplied to the Peltier heat pump during the drying phase of the drying process.

4. The method as claimed in claim 2, comprising, during the end phase, one of: decreasing a level of the electrical power supplied to the Peltier heat pump for a predetermined period of time;
   decreasing a level of the electrical power supplied to the Peltier heat pump until a predetermined temperature threshold value is reached in the household appliance; and
   decreasing a level of the electrical power supplied to the Peltier heat pump until a process air of the drying process reaches a predetermined moisture threshold value.

5. The method as claimed in claim 2, wherein the varying the electrical power supplied to the Peltier heat pump during the drying process includes varying one of an electrical voltage and an electrical current of the power supplied to the Peltier heat pump.

6. A method for operating a household appliance for taking care of laundry, comprising activating a Peltier heat pump of the household appliance and supplying the Peltier heat pump with electrical power for drying the laundry, wherein the supplying step comprises varying the power supply of the Peltier heat pump during a drying process as a function of a reached process phase of the drying process, and wherein the varying step comprises setting an increased power level supplied to the Peltier heat pump for a predetermined period of time, wherein a rated design value of the Peltier heat pump corresponds to the electrical power level during the drying phase, the step of setting an increased power level comprises increasing the level of the electrical power supplied to the Peltier heat pump during the heat-up phase of the drying process to a level greater than the rated design value of the Peltier heat pump.

* * * * *